(No Model.) 9 Sheets—Sheet 1.
T. J. GRAY.
MACHINE FOR PICKING COTTON.

No. 401,268. Patented Apr. 9, 1889.

(No Model.)

9 Sheets—Sheet 5.

T. J. GRAY.
MACHINE FOR PICKING COTTON.

No. 401,268. Patented Apr. 9, 1889.

Witnesses:
Jas. E. Hutchinson
V. E. Hodges

T. J. Gray Inventor.
By his Attorney H. A. Seymour

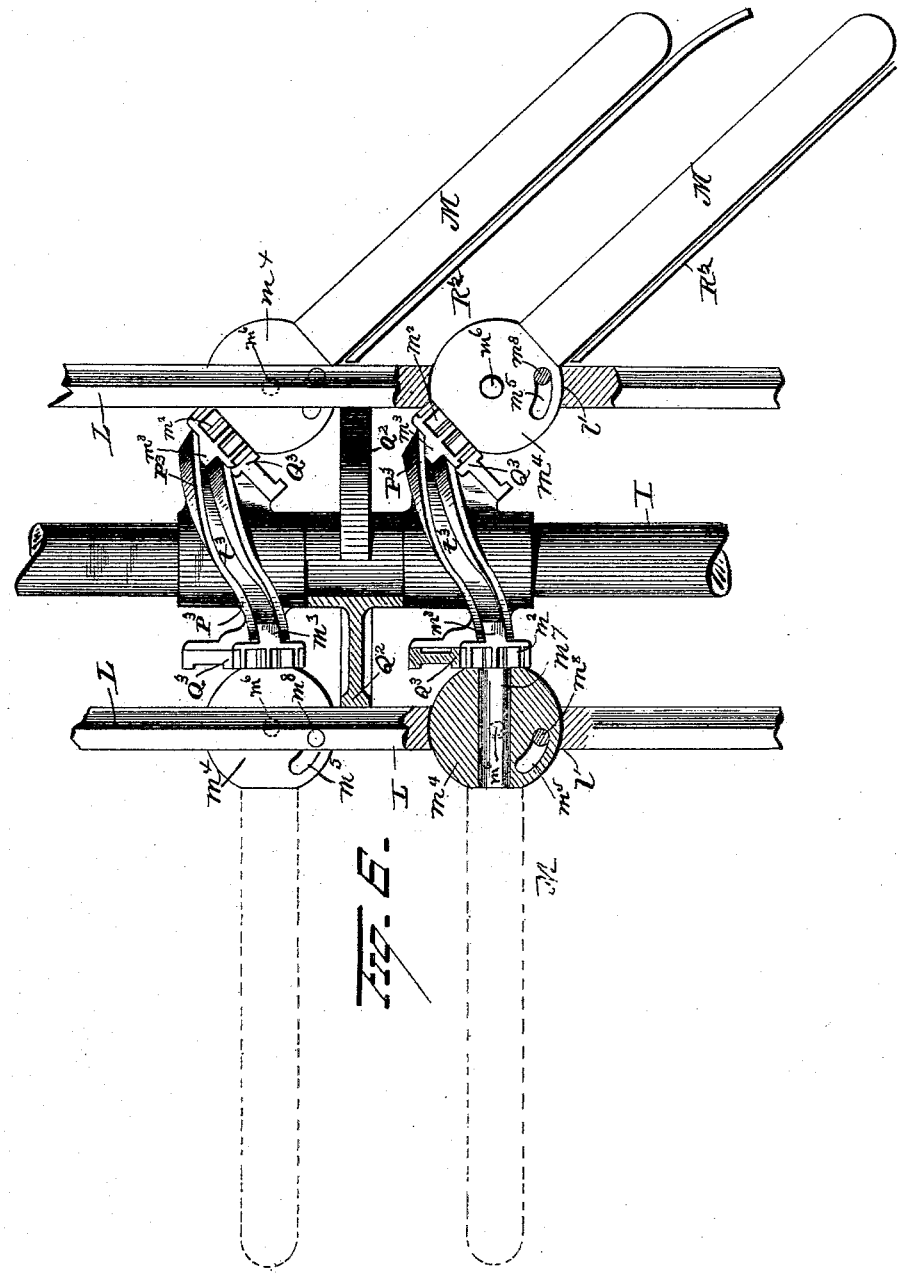

(No Model.) 9 Sheets—Sheet 7.
T. J. GRAY.
MACHINE FOR PICKING COTTON.
No. 401,268. Patented Apr. 9, 1889.
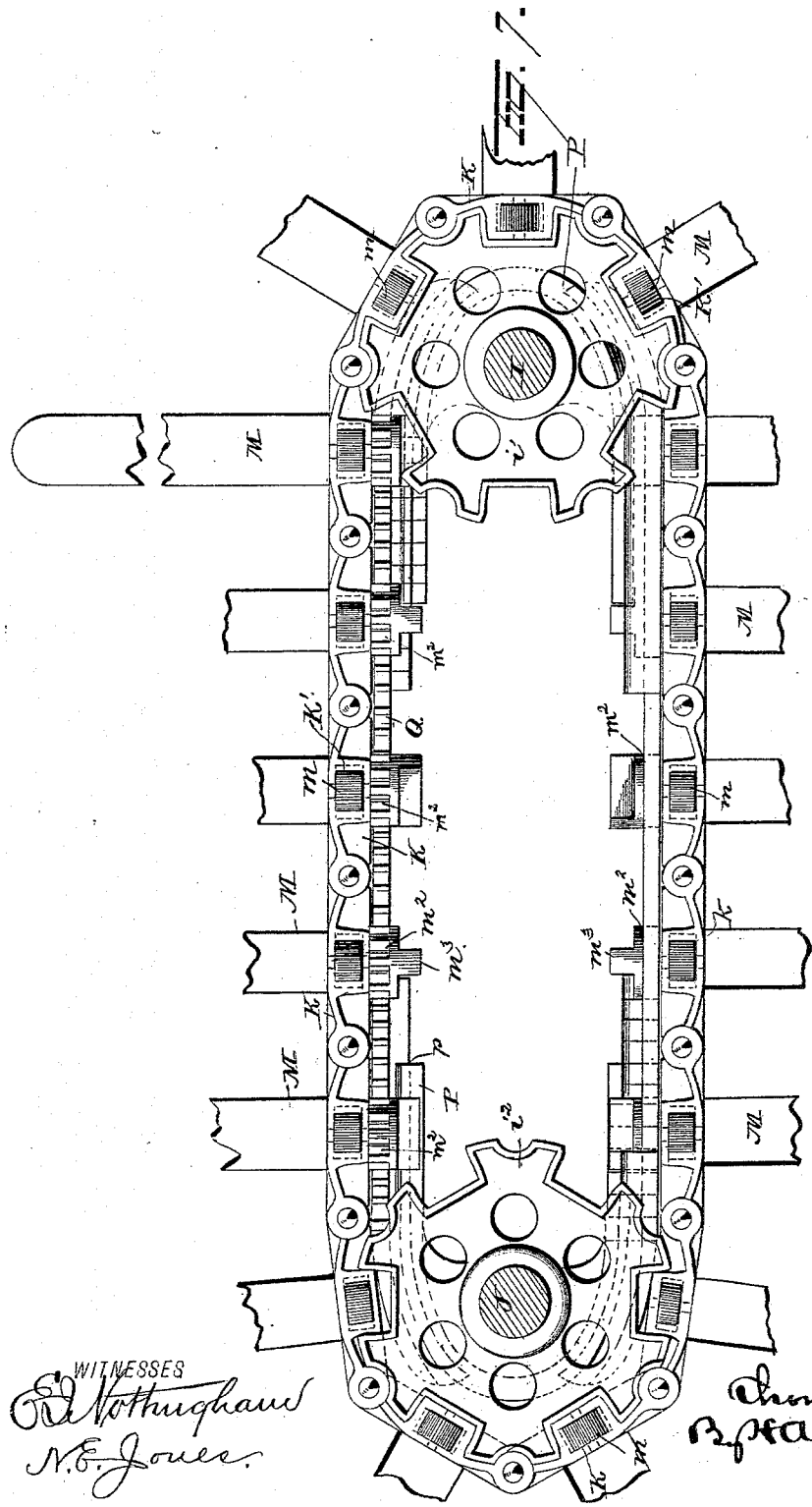
WITNESSES
INVENTOR (No Model.)
9 Sheets—Sheet 8.
T. J. GRAY.
MACHINE FOR PICKING COTTON.
No. 401,268. Patented Apr. 9, 1889.
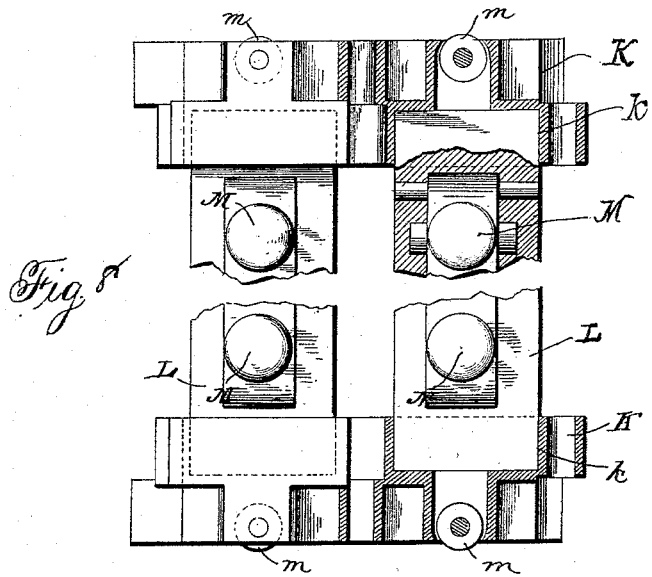
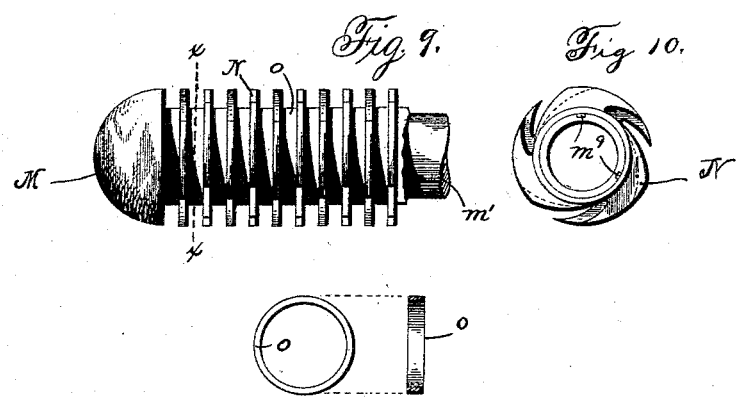

(No Model.) 9 Sheets—Sheet 9.
T. J. GRAY.
MACHINE FOR PICKING COTTON.
No. 401,268. Patented Apr. 9, 1889.
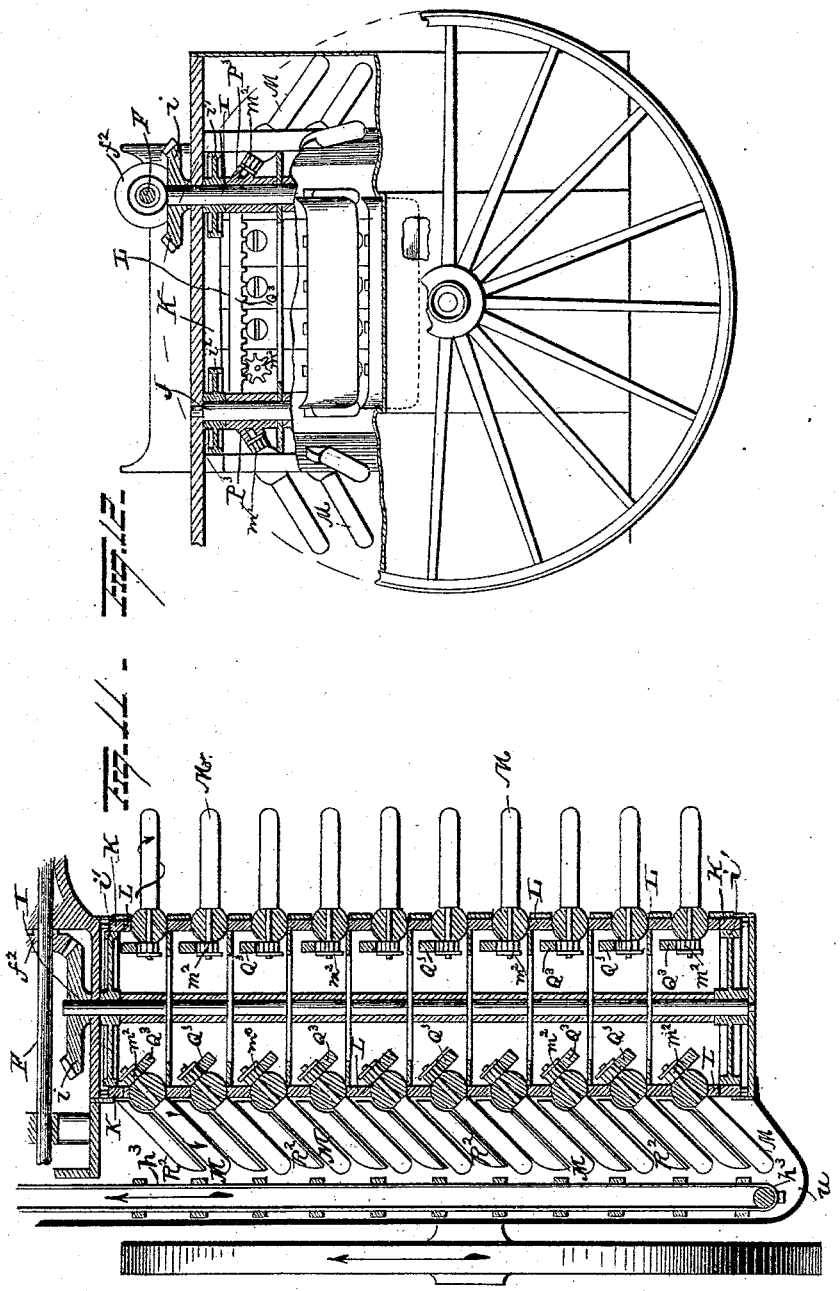
WITNESSES
INVENTOR
*Attorney*

UNITED STATES PATENT OFFICE.

THOMAS J. GRAY, OF CHICAGO, ILLINOIS.

MACHINE FOR PICKING COTTON.

SPECIFICATION forming part of Letters Patent No. 401,268, dated April 9, 1889.

Application filed March 3, 1886. Serial No. 193,863. (No model.)

*To all whom it may concern:*

Be it known that I, THOMAS J. GRAY, of Chicago, in the county of Cook and State of Illinois, have invented certain new and useful Improvements in Machines for Picking Cotton; and I do hereby declare the following to be a full, clear, and exact description of the invention, such as will enable others skilled in the art to which it appertains to make and use the same.

My invention relates to machines for picking cotton from the plants in the field; and the object of the same is to produce a machine which shall be more simple and durable in construction and of greater capacity than previous machines of this class.

My invention consists in the peculiarly-constructed frame for carrying the picker-stems; also, in the peculiar and novel connections for actuating the picker-carrying frame; furthermore, in the peculiar and novel attachment of the picker-stems to their carrying-frames; in the peculiar and novel connections for rotating the picker-stems, and in the construction of the picker-disks, and, finally, in the general construction and arrangement of the machine, all as hereinafter described and claimed.

In order that my invention may be fully understood, I will proceed to describe it with reference to the accompanying drawings, in which—

Figure 1:
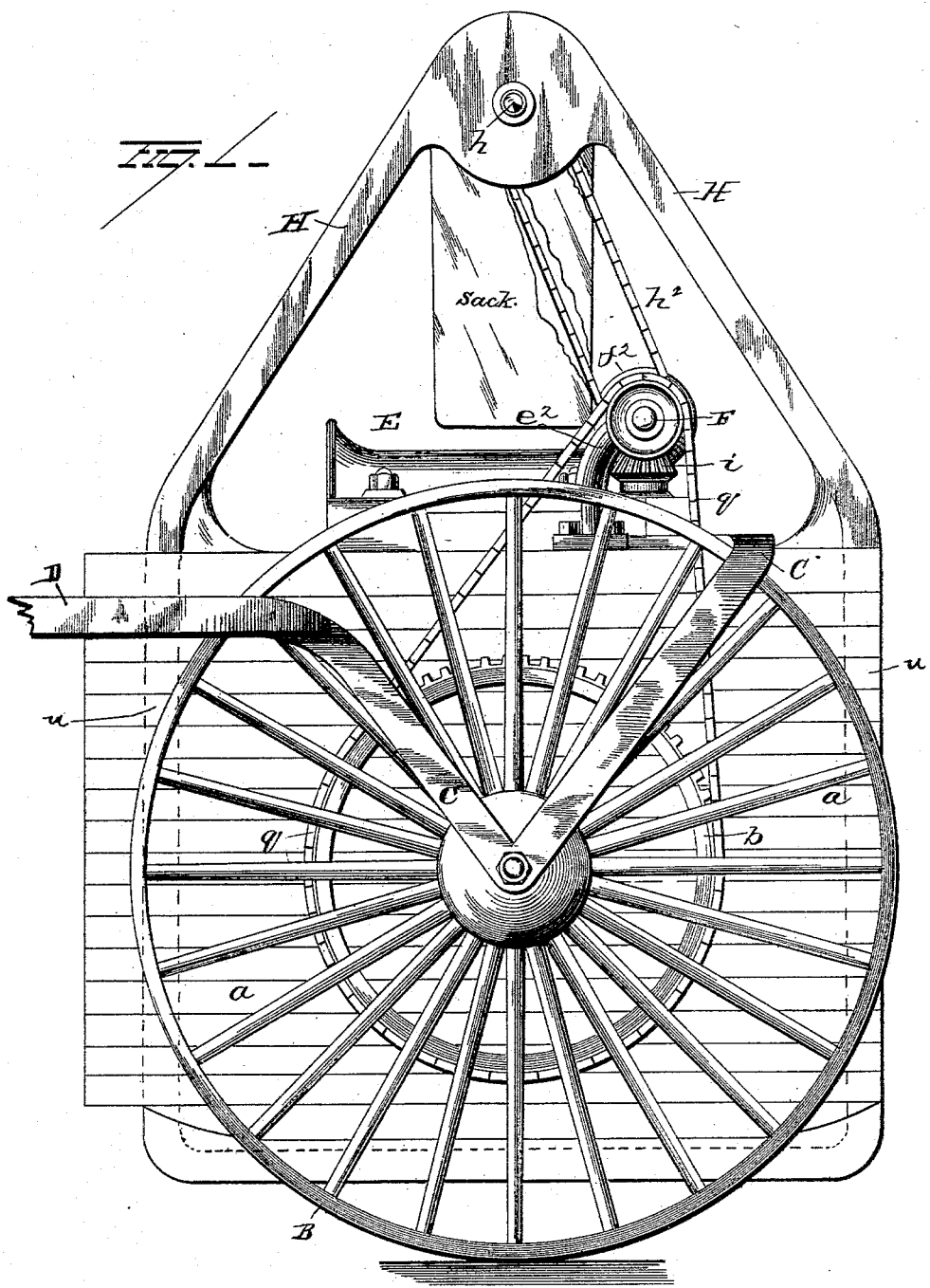
Figure 2:
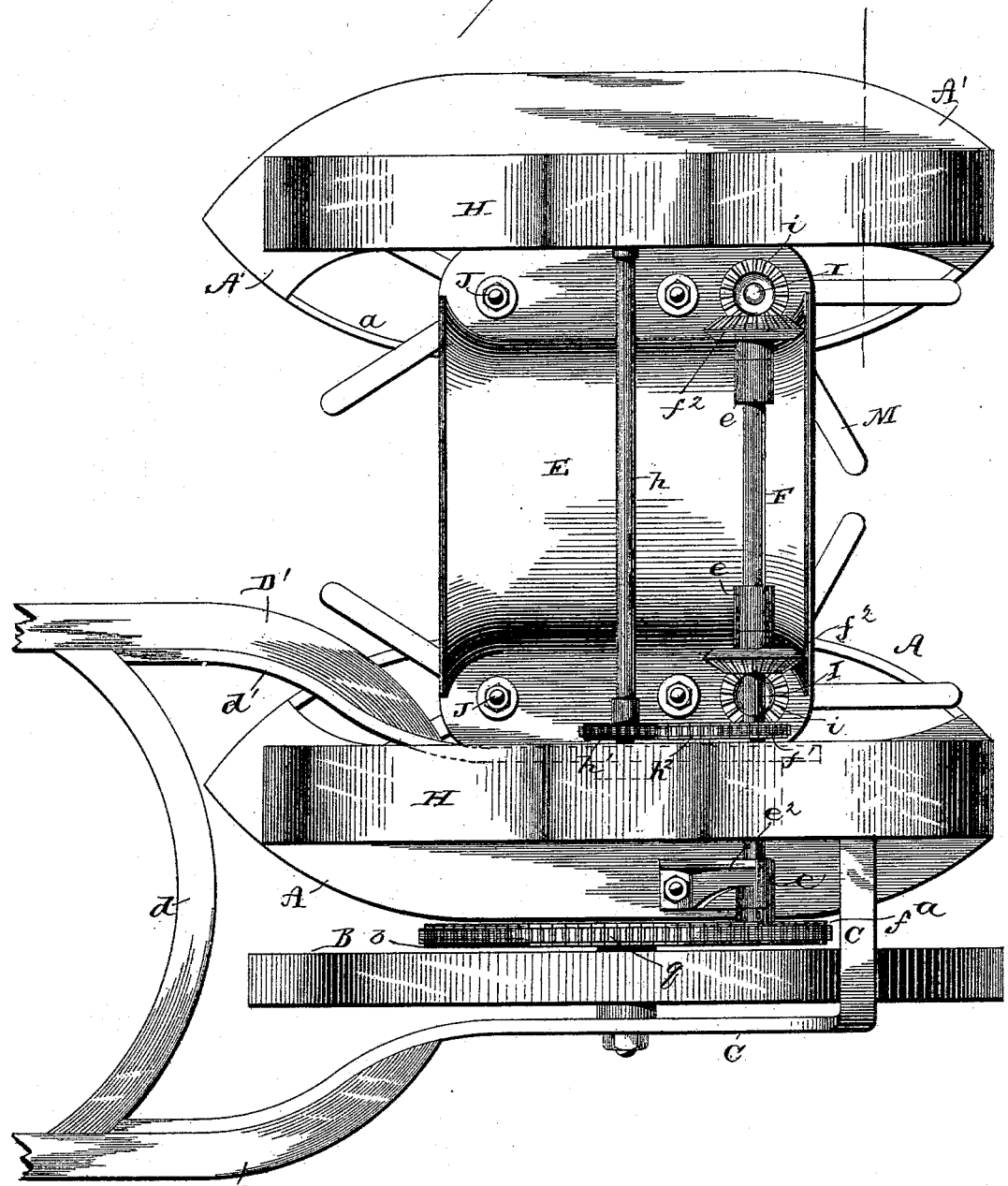
Figure 3:
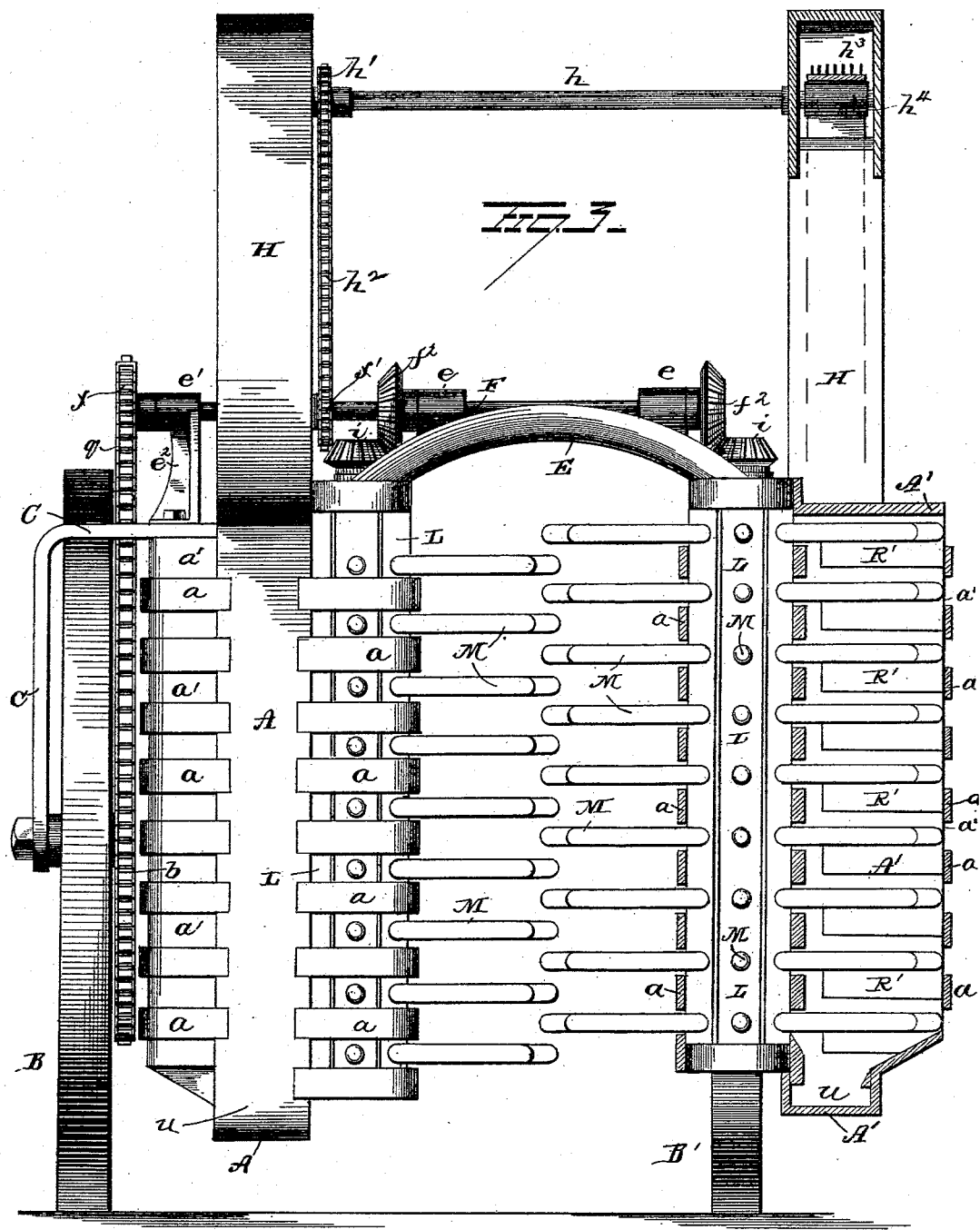
Figure 4:
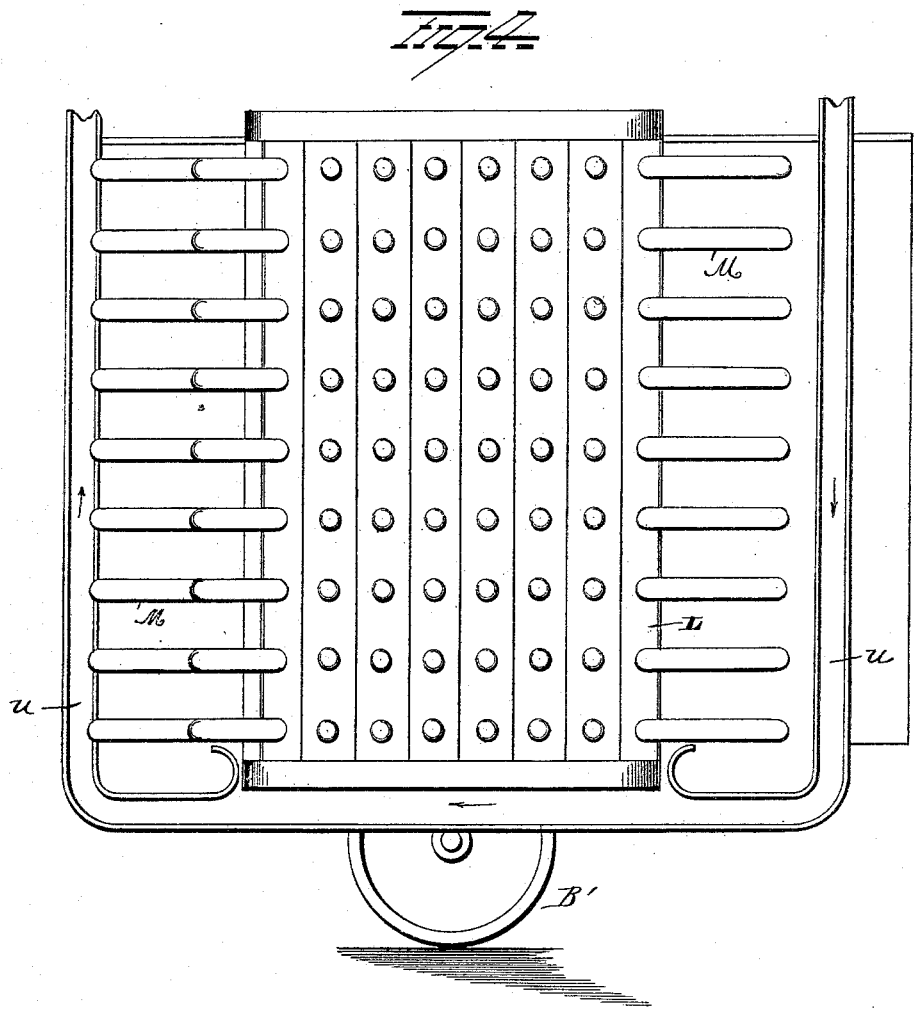
Figure 5:
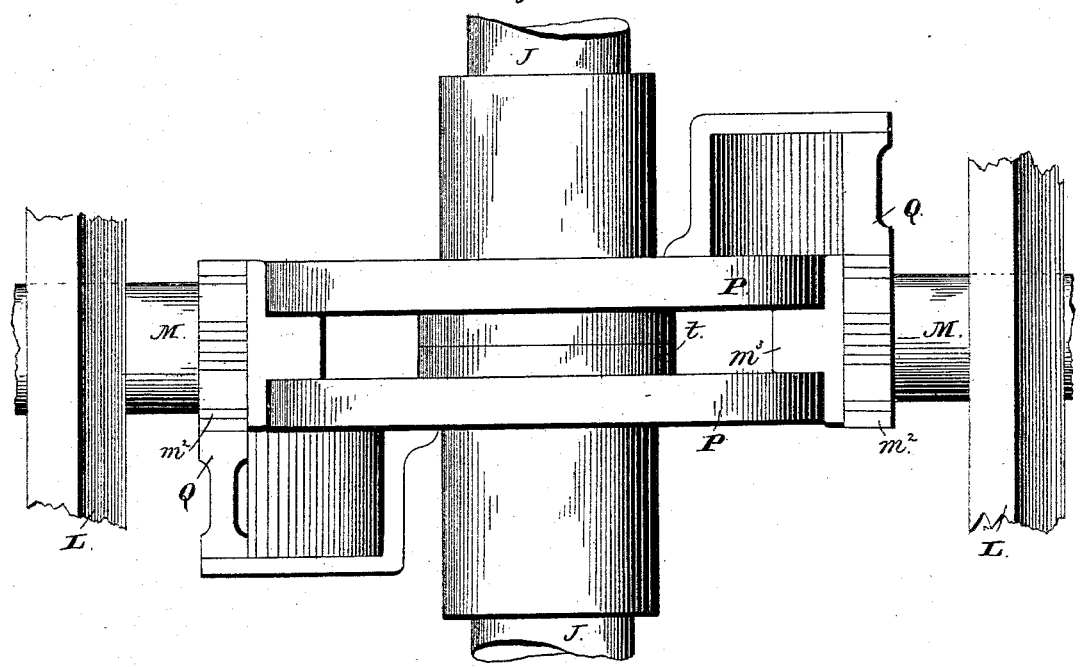
Figure 13:
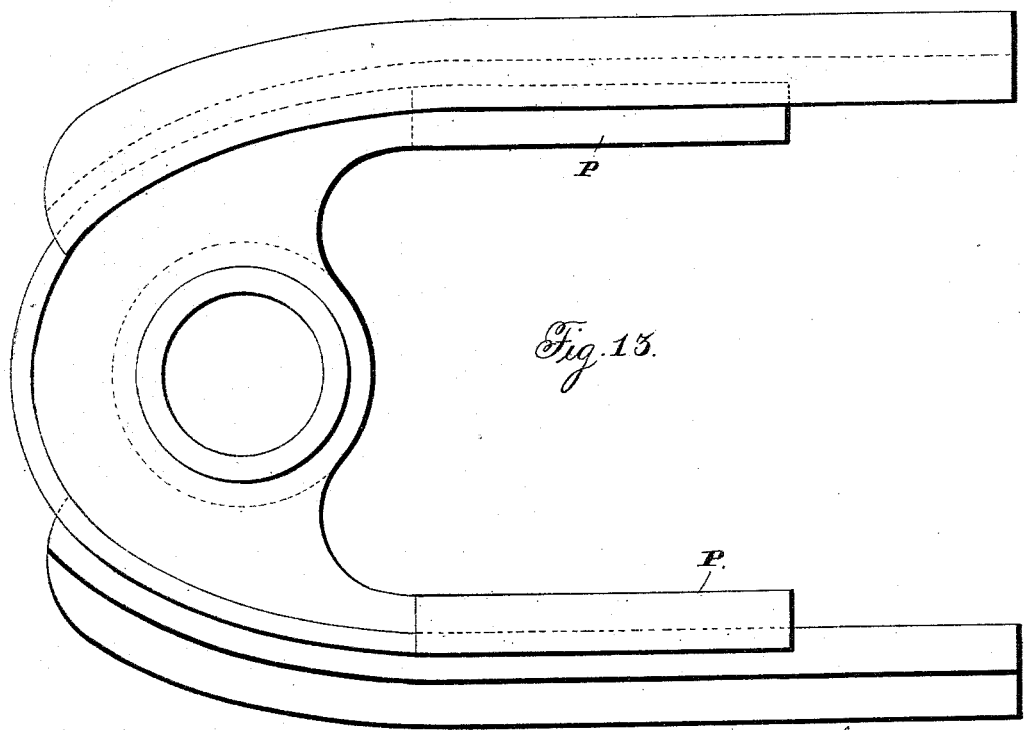

Figure 1 is a view in side elevation of my improved machine. Fig. 2 is a plan view of the same. Fig. 3 is a view in rear elevation, partly in section. Fig. 4 is a view of the outer side of one of the housings, the outer wall thereof being removed. Fig. 5 is a detached view showing the mechanism for rotating the picker-stems and for guiding them while turning the corners. Fig. 6 is a similar view of a modified construction of parts for rotating the stems and for guiding the latter while turning the corners. Fig. 7 is a plan showing the upper endless chain and mechanism for operating the same and the guides and racks for the picker-stems. Fig. 8 is a view in elevation showing a portion of the chain and connected slats, the latter being broken away at the center. Fig. 9 is a view in elevation of one of the picker-stems. Fig. 10 is a view in section on the line $x\,x$ of Fig. 9. Fig. 11 is a view in transverse vertical section through one of the housings, with the construction shown in Fig. 6 therein for guiding the stems and holding the outer picker-stems in an inclined position. Fig. 12 is a view, partly in side elevation and partly in section, of same; and Fig. 13 is a detached view in plan of one of the cams R.

Machines of the class to which my invention relates are composed of a suitable framework mounted upon running-gear and having a central longitudinal passage, through which the plants pass as the machine is propelled along the ground, and the pickers or strippers are located at either side of the frame, so as to operate upon the plants when within the passage-way of the machine.

In the said drawings, A A' represent the two sections of housing which compose the frame of the machine. Each section is approximately elliptical in horizontal section, the front part being preferably brought to an edge to permit of the ready entrance of the plants, while the rear portion is squared off, as shown in Fig. 2. For the purpose of combining strength with lightness, each section of the housing is formed of a series of horizontal curved bars, $a$, and a canvas or sheet-metal apron or lining, $a'$, which is omitted on the inner sides of the section. The section A is supported upon a large carrying-wheel, B, the axle of which extends inwardly from the apex of an inverted triangular frame, C, one end of which is securely attached to the top of section A, while the opposite end is attached to shaft D. Shaft D is connected to the shaft D' by a cross-bar, $d$, and the rear end of this shaft D' is attached by an arm, $d'$, to the inner front portion of section A in any approved manner.

Section A' is mounted upon a truck-wheel B', swiveled to the base of said section. The two sections are also connected at the top by a curved brace or bridge, E, which binds the parts of the frame securely together. A shaft, F, extends transversely of the machine over and along bridge E, and is journaled in bearings $e\,e$, extending upward from said bridge. The outer end of said shaft is also journaled in a bearing, $e'$, formed at the upper end of a standard, $e^2$, which extends upward from the top of section A. At its outer end shaft F carries a sprocket-pinion, $f$, over which passes a drive-chain, $q$, from a sprocket-wheel, $b$, secured to the inner side of carrying-wheel B. Extending upward from sections A A' are two hollow frames, H, one for each section, and between these frames runs a horizontal shaft, $h$, carrying a sprocket-pinion, $h'$, over which passes a drive-chain, $h^2$, from a sprocket-pinion, $f'$, upon shaft F. The shaft $h$ carries at each end, within the frames H, a pulley, $h^4$, for the carrier belts or elevators $h^3$, as hereinafter described.

Extending downward through the rear portion of each section A A' is a shaft, I, carrying a beveled pinion, $i$, at its upper end, the said beveled pinion meshing with the beveled pinion $f^2$ upon shaft F. Each of the vertical shafts I carries within the housings or sections, A A', two sprocket-wheels, $i'$, one of which is near the upper end and the other near the lower end of each shaft I. At the front end of each section A A' is placed a vertical shaft, J, similar to shafts I, excepting that while the latter rotate the shafts J are preferably rigid.

Each shaft J carries a sprocket-wheel, $i^2$, on its opposite end free to revolve on the shaft. Around the sprocket-wheels, at the upper and lower ends of the housing, as shown in Fig. 11, pass the endless chains K, the construction of which is shown in Figs. 7 and 8. Each chain-link has a roller, $m$, projecting from its outer face adapted to furnish anti-friction bearings for the chains, slats, and pickets, and recesses $k$ (see Fig. 8) in its inner face for the reception of the ends of the slats L, and the upper and lower chains are arranged with their recesses toward each other—that is to say, the recesses in the lower chain open upwardly and the recesses in the upper chain open downwardly, and the opposite ends of the slats L are secured in the recesses. These slats are set close together and form a sort of endless belt, and each slat carries a set of picker-stems, M, which latter are rotated by mechanism to be hereinafter described for pulling the cotton from the bolls.

As shown in Figs. 3 and 4, the picker-stems are journaled in the slats, and are adapted to move completely around in their housings while in a horizontal position. Each stem consists of a central rod or tube having one or more grooves, $m'$, adapted to receive corresponding splines or ribs, $m^9$, on the picker-disks N, which are slipped onto the rod and have washers $o$ interposed between them. The splines and grooves prevent the disk and washers from rotating independently of the stems. The picker-stems are arranged in horizontal planes in the slats L of the belt, and each stem is provided at its inner end with a pinion, $m^2$, as shown in Figs. 6, 7, 11, and 12, adapted to engage the racks Q, which latter operate all the stems located in the same horizontal series therewith. Each pinion is also provided with an elongated lug, $m^3$, which latter is adapted to engage the guides, or, that is, enter the grooves $t$ in the guides P and hold the stems stationary while turning the corners. The rack-bars Q are located within the housings, between and secured to the guides, and hence when the lugs $m^3$ enter the grooves $t$ of the guides P at one side they are held in position to immediately engage the rack-bars after leaving the grooves.

The guides P (shown in Figs. 5 and 7) are located within the housings at the ends thereof, the guides on the stationary shafts J being preferably secured to said shaft, and the guides on the shafts I being loose thereon and rigidly attached to the housings or other supports. A pair of guides, one at each end, is used for each horizontal series of picker-stems, and the racks Q for each pair of guides extend on each side along the interior of sections or housings A A', said racks being secured at their ends to the guides P, as shown in Fig. 5, the inner racks being above the level of the outer racks. The toothed surfaces of the inner racks face downward, while the toothed surfaces of the outer racks face upward. It will thus be seen that as the drive-chains K travel around the wheels $i'$ $i^2$ the pinions $m^2$ of the picker-stems M will be engaged alternately above and below by the racks Q, located horizontally between the shafts I and J, the teeth on one rack extending in a downward direction and on the other in an upward direction, so that the picker-stem will revolve in one direction while passing through the central passage of the machine, and revolve in the opposite direction while passing through the frames or housings and while passing from the rack on one side to the rack on the other side, or, that is to say, while turning the corners the lugs $m^3$ enter the grooves $t$ in their respective guides P and hold the picker-stems in a horizontal position, as shown in Fig. 4.

In the construction above described the picker-stems are journaled in the slats and project therefrom in horizontal positions. On the inner face of the outer side of each housing or section flat bars or arms R' (shown clearly in Figs. 3 and 4) extend inward in close contact with the picker-stems and serve as cleaners to remove the gathered cotton from the stems. The cleaners are set obliquely to their vertical planes, so as to act edgewise upon the picker-stems.

In order to lessen the width of the machine, the modified construction of guide slats and racks shown in Figs. 6, 11, 12, and 13 may be used. In this arrangement, as in the other, guides $Q^2$ (shown in Fig. 6) are mounted at suitable distances apart on the shafts I and J and afford bearing for the apron or slats L while passing around the shafts, their size being sufficient to always maintain a proper relative distance between the shaft and the apron, so as to permit a perfect operation of the parts located in this space, and the racks $Q^3$ on the outer side of the housing are set obliquely, as shown in Figs. 6, 11, and 12, upon the guides $P^3$, the grooves $t^3$ of which are curved so as to bring the stems from a horizontal position to a downwardly-inclined position while the pickers are passing from the passage-way into the housing or section and turn them from an inclined to a horizontal position just as they leave the housing. In this construction the picker-stems M, instead of being axially journaled in the slats, as previously explained, are similarly journaled in the flat cylindrical or disk-shaped bearings $m^4$, (shown in Figs. 6 and 13,) each of which is provided with a curved slot, $m^5$, and two diametrically oppositely-projecting lugs or trunnions, $m^6$, at right angles to the axis of the stem. The slats are made in two longitudinal sections formed with a contiguous recess, $l'$, to receive the bearings $m^4$ and trunnions $m^6$, and are secured together with the bearings $m^4$ clamped between them by the pins $m^8$, passing through the slats and bearings. The slots $m^5$ in these bearings are in the arc of a circle concentric with the trunnions $m^6$ of the bearings $m^4$, and are so located as to permit pins $m^8$ to be passed through the whole or portion of the slat and through said slots and limit the vertical rocking movements of the bearings. The inner ends of the stems M are reduced at $m^7$ to pass through the flat bearings $m^4$, so that said stems may revolve in the bearings. In this modified construction the racks $Q^3$ on the outer side of each housing or section are inclined and the racks $Q^3$ on the inner side, or the sides adjacent to the central longitudinal passage, are vertical, and by virtue of this construction the stems extend horizontally from the slats L when passing through the central passageway of the machine, and when passing along the outer sides of the frame sections or housings the stems drop obliquely downward. The wipers $R^2$, (shown in Fig. 6,) for the purpose of removing the cotton from the stems while passing through the housings, are set obliquely to correspond with the position of the stems M, and each wiper is preferably located below the stem upon which it acts, although it may be above said stem, if desired. These wipers are secured to the inner wall of the casing, as indicated by dotted lines, Fig. 12.

Conduits $u$ extend upward along the ends of the frame-sections A A' of the housings, forming spaces which communicate at the bottom with the interior of the sections and at the top with the interior of the hollow frames H. Elevator-belts $h^3$ run over the pulleys $h^2$, through said conduits and hollow frames upon shaft $h$, and serve to carry the cotton which drops to the bottom of the housings upward, thence dropping it into a sack or sacks suspended beneath frames H.

The picker-disks N (see Fig. 10) are each formed with peripheral teeth $n$, the backs of which are curved concentrically to the axis of stems M, and the teeth of which are prolonged in the line of this curvature. Thus when the disks are set upon the stems they form a series of true circles, so that while the teeth act sufficiently upon the cotton they are protected from contact with the stems or branches of the plants.

The machine is light, compact, and durable in construction and of great capacity. It is designed to be hauled by a horse hitched between the shafts D D', and said shafts are so placed that the animal shall walk between the rows of plants.

I do not wish to be understood as limiting myself exclusively to the precise details of construction herein described, as various modifications in such details may be made without departing from the spirit of my invention.

Having fully described my invention, what I claim as new, and desire to secure by Letters Patent, is—

1. In a cotton-harvesting machine, the combination of horizontally-traveling endless belts or aprons carrying a series of rotating picker-stems, pinions located upon said stems, racks on the frame engaged by the pinions and imparting opposite rotations to the stem, and guides located in position on the frame to receive ends of the picker-stems and prevent their rotation while turning corners, substantially as set forth.

2. In a cotton-harvesting machine, the combination, with a traveling endless belt composed of a series of bars or slats secured at their ends in a pair of drive-chains, said chains having eyes or openings to receive the ends of the slats, of picker-stems mounted in said slats, pinions on the inner ends of the stems, rack-bars on the frame for rotating the picker-stems, and guides on the frame, through which lugs on the pinions pass to prevent their rotation while turning corners, substantially as set forth.

3. In a cotton-harvester, the combination, with a housing composed of a series of separated bars extending longitudinally of the machine, of a canvas or sheet-metal apron or lining covering the spaces between the bars, upright shafts carrying sprocket or pulley wheels, chains mounted on said wheels, vertical slats secured to the chains, and rotating picker-stems mounted in the slats, substantially as set forth.

4. The combination, with the frame-sections A A' and the bridge E, connecting the same, of the triangular frame C, in which the axle of the carrying-wheel B is supported, and the connected shafts D D', connected to the adjacent housing, substantially as set forth.

5. The combination, with housings, vertical shafts arranged therein, one behind the other, the sprocket-wheels secured on said shafts, the upper and lower drive-chains mounted on the sprocket-wheels, the upper chains having sockets on their lower faces and the lower chains sockets on their upper faces, the slats or bars secured in said sockets, picker-stems mounted in the slats, racks on the frame and pinions on the stems for rotating the picker-stems, the guides located at the ends of the housings, and lugs on the pinions for controlling the direction of movement of the slats and picker-stems, substantially as set forth.

6. In a cotton-harvesting machine, the combination, with a traveling endless belt and a series of picker-stems carried therein, said pickers having lugs on their inner ends, in combination with guides in the interior of the frame for throwing the stems downward, and wipers affixed in close proximity to the stems for removing the cotton from the stems while in this position, substantially as set forth.

7. The combination, with the frame-sections carrying the hollow elevator-frames, of the partitions forming conduits or channels $u$, communicating at the bottom with the interior of the sections and at the top with the hollow frames, and the elevators adapted to move through the conduits, substantially as set forth.

8. The combination, with a housing, an endless belt or apron therein, and picker-stems mounted in the apron and provided with flattened inner ends, of stationary guides adapted to receive the flattened ends of the picker-stems as the latter pass around the shafts, substantially as set forth.

9. The combination, with an endless belt or apron mounted on vertical shafts, picker-stems mounted therein and provided with pinions, and the rack-bars, one of which is arranged obliquely, as shown, of the stationary guides located between the rack-bars and adapted to direct the stems from the rack-bar on one side of the shaft to the rack-bars on the other side of said shafts, substantially as set forth.

10. The combination, with an endless apron and oscillating flat circular bearings pivotally mounted in the apron, of picker-stems journaled in said oscillating bearings, and devices for rotating the picker-stems, substantially as set forth.

11. The combination, with the shafts I and J and sprocket-wheels mounted thereon, of endless chains engaging the sprocket-wheels, slats secured to the chains, the picker-stems mounted in the slats, pinions secured on the picker-stems and provided with the elongated lugs, and racks on the frame in position to be engaged by the pinions, of the stationary guides having grooves with which the elongated lugs engage while the stems are turning the corners, substantially as set forth.

12. The combination, with shafts I J, an endless belt or apron mounted thereon, oscillating and rotating picker-stems mounted in said belt or apron, said pickers having pinions thereon and lugs on the pinions, of rack-bars and stationary guides having inclined cam-grooves adapted to receive the lugs on the pinions, and thereby oscillate the stems as they pass through the grooves, substantially as set forth.

In testimony whereof I have signed this specification in the presence of two subscribing witnesses.

THOMAS J. GRAY.

Witnesses:
   JOHN T. GREENE,
   P. RICHELSEN.